May 5, 1970        B. FUTTERER        3,510,745

MULTI-PURPOSE POWER PACK

Filed March 14, 1968        3 Sheets-Sheet 2

May 5, 1970            B. FUTTERER            3,510,745
MULTI-PURPOSE POWER PACK
Filed March 14, 1968            3 Sheets-Sheet 3

United States Patent Office 3,510,745
Patented May 5, 1970

3,510,745
MULTI-PURPOSE POWER PACK
Bodo Futterer, Handelshof, Switzerland, assignor to Interelectric Sachseln A.G., Sachseln, Switzerland, a company of Switzerland
Continuation-in-part of application Ser. No. 493,333, Oct. 6, 1965. This application Mar. 14, 1968, Ser. No. 713,118
Claims priority, application Germany, Oct. 7, 1964, 126,659
Int. Cl. H01m 45/04; H02j 7/14, 7/22
U.S. Cl. 320—7 2 Claims

ABSTRACT OF THE DISCLOSURE

A multi-purpose power pack in which a gas-tight storage battery is recharged by a generator which is manually driven through a transmission, the generator and transmission being designed and constructed such that a charging current of from 10 to 100 times the rated charging current of the battery is produced.

CROSS REFERENCE TO RELATED APPLICATION

This application is a continuation-in-part of application Ser. No. 493,333, filed Oct. 6, 1965, now abandoned.

BACKGROUND OF THE INVENTION

This invention relates to an emergency power pack with a charging device and a gas-tight, relatively maintenance free storage battery and a small volume power consumer connected to the battery, with a charge generator, with which the battery can be charged if necessary.

Equipment of this type is known in a wide variety of models. The motor vehicle battery, for example, is so connected to the generator of the vehicle that it can constantly be recharged, automatically, while driving. But the disadvantage of this arrangement consists in the fact that the vehicle must, to a certain extent, be driven constantly. If it stands idle for a long period of time, there is no recharging.

We also know of battery operated equipment, for example, flashlights, which can be recharged from a plug or outlet. If an outlet is not available for a long period of time, for instance during trips, then the equipment cannot be used beyond one battery charge.

Further, charging or recharging takes a comparatively long period of time. If we forget to recharge and if we notice that the battery fails only as we try to use the flashlight, there is no possibility of again making the flashlight immediately ready for use.

Also known are charging devices for batteries in which a generator is built into a bicycle-like structure and can be set in motion by stepping on the pedals. This device cannot readily be adapted for hand operation because man is not capable of mustering enough sustained effort when he tries to generate power by hand; that is to say, he cannot generate enough power to charge a battery for a long period of time.

SUMMARY OF THE INVENTION

The present invention is based on the task of creating an emergency power pack of the type mentioned above; in other words, a unit that is independent of power networks and that does not require any advance recharging but which practically, and at any time, makes it possible to render a piece of equipment, which is fed by a gastight battery, ready for use in a short time, if the battery has run down.

The solution of this task should be seen essentially in the fact that the charging generator, which is provided with mechanical manual drive and with a transmission gear, is designed for the job of putting on the 10-fold to 100-fold rated charging current of the battery, during the peak output period. In other words, the transmission gear and the charge generator are to be so dimensioned and designed that the completely discharged battery can be fully charged in $\frac{1}{10}$–1 hour.

We do, of course, know that we can charge standard lead batteries with a considerably higher current intensity than its rated charging current intensity, which usually is adjusted for a 10-hour charge. Standard batteries, however, cannot be used in hand-powered equipment because of the danger of escape of the electrolyte, so that it has been impossible so far to design an emergency power pack for small current consumers which could be recharged in a short time without any outside power supply or outlet.

It was discovered, quite surprisingly, that the rated charge current intensity, which is prescribed for gas-tight batteries, such as, for example, nickel-cadmium batteries, can be exceeded considerably if we make sure that the charging takes place within the capacity limits of the battery; in other words, if we avoid an overload. This can be achieved when the charge generator is hand-powered by dimensioning the transmission gear and the charge generator, in accordance with this invention, because one hand can put out a force which corresponds to a high-output period of no more than 10 minutes.

If we use a gas-tight battery with a capacity of 0.2 ah., which is normally supposed to be charged with a charge current intensity of 20–25 ma., we could therefore apply a charging current intensity between 0.2 a. and approximately 2 a., according to the instant invention, and the charging time would accordingly be reduced to 1 hour to 6 minutes, respectively. The advantage obtained by this invention, that is to say the considerable time saving during recharging, is undoubtedly worth noting here.

In these comparatively high charge current intensities, the generator must normally have a greater capacity than the motor; we therefore employ as the charge generator, preferably, at least two generator units which are coupled coaxially with each other and in a parallel-axis arrangement, which are placed next to the battery, and which can be connected either parallel or in series. This enables us to achieve a better adaptation to the optimum efficiency range, particularly when we use machine units with permanent exciter magnets and an ironless, or coreless motor.

Another, even better embodiment, which facilitates easy adaptation to charge operation and motor operation of the emergency power pack according to this invention, employs merely one machine unit which can be operated both as the charge generator and as the motor, whereby, however, the battery contains at least two separate battery units which can be connected in parallel or in series to the charge generator. The charging generator is connected, in the charging operation, with a series connection of the battery units and, in the motor operation, with a parallel connection of these units. The transmission gear here is so dimensioned that the machine unit, when operated as charge generator, puts out a considerably larger number of r.p.m. than when operated as motor.

BRIEF DESCRIPTION OF THE DRAWINGS

The invention is described below with the help of diagrams, showing various possible versions by way of supplementation.

FIG. 1 shows an emergency power pack according to this invention which is intended for connection to the electric power consumer.

FIG. 2 shows an emergency power pack according to the invention which is intended for connection to electrical or mechanical consumers.

Figure 4:
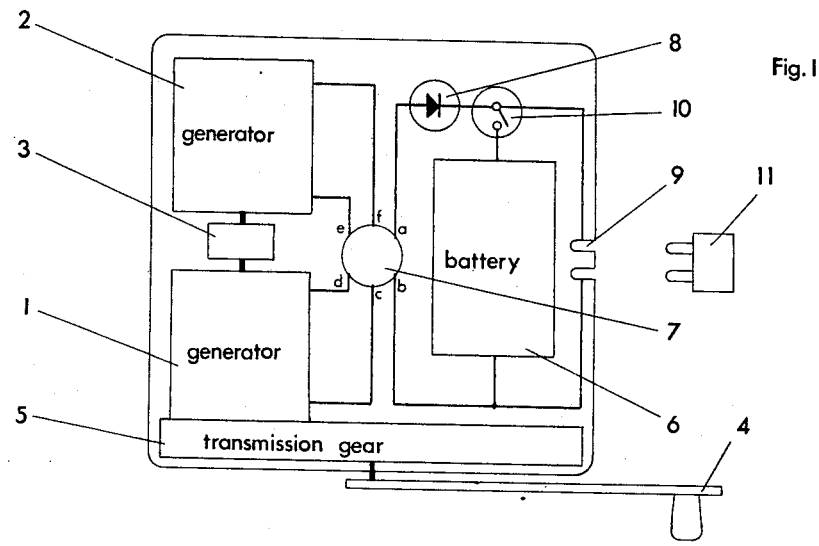
FIGS. 4, 5, and 6 show various switching positions for switches 7 and 107.

In the drawings, identical structural parts in the various embodiments are indicated with reference numbers whose last two digits agree with each other.

DESCRIPTION OF THE PREFERRED EMBODIMENTS

Figure 5:
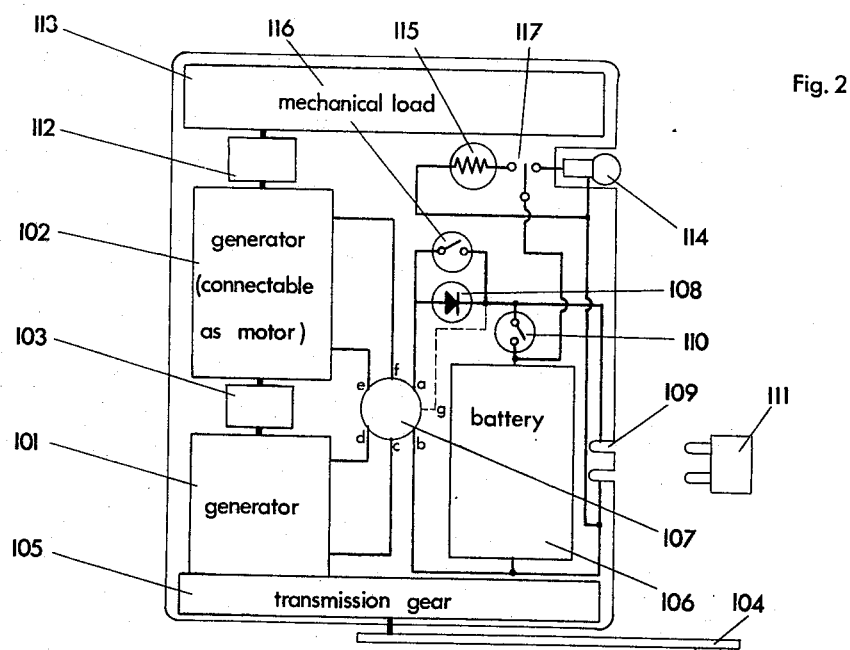

The emergency power pack shown in FIG. 1 consists of two generator units 1 and 2 which are connected with each other by means of coupling 3. The electrical connections of the generator units lead to a series-parallel switch 7 whose switching positions are indicated in FIGS. 4 and 5. One of the output lines $a$ of the series parallel switch 7 runs via a rectifier 8 to a contact at a plug bushing 9, while the other output line $b$ is connected with the other contact of the plug bushing 9 as well as with one pole of the battery. The other pole of the battery is connected with a contact of the plug bushing via a simple on-off switch 10. Attached to generator unit 1 is a transmission gear 5 which is provided with hand crank 4.

To operate the emergency power pack, the hand crank 4 is turned. In this process, the two generator units 1 and 2 are set in a rotating motion by means of transmission gear 5. The two generators are so dimensioned that they put out the same voltage if the r.p.m. are the same. By means of series-parallel switch 7 we can connect the two generator units in series or parallel in such a way that the emergency power pack can be used for two different voltages which are available at bushing 9. Battery 6, of course, is charged at a certain voltage which may correspond to the series-connection or the parallel-connection of the generator units.

The structure of the switch is indicated in FIGS. 4 and 5. FIG. 4 shows the switch in parallel connection, in which the contacts $d$, $f$, and $a$ on the one hand, as well as $e$, $c$, and $b$, on the other hand, are connected with each other.

In this position, the generators 1 and 2 are connected in parallel and, with switch 10 open, the generators 1 and 2 will be connected to the contacts of plug bushing 9. With switch 10 in the closed poistion, the generators 1 and 2 will be connected to the terminals of battery 6.

By rotating the switching segments, which are indicated inside the circle in FIGS. 4 and 5, in the clockwise direction, we obtain the series connection position illustrated in FIG. 5 where, in each case, the contacts $f$ and $a$, $d$ and $e$, as well as $c$ and $b$ are connected with each other. FIGS. 4 and 5 show that contacts $c$ and $b$ are always directly connected with each other.

In this position, the generators 1 and 2 are connected in series and, with switch 10 open, the generators 1 and 2 will be connected to the contacts of plug bushing 9. With switch 10 in the closed position, the generators 1 and 2 will be connected to the terminals of battery 6.

As pointed out above, the series and parallel connections allow the choice of two voltage outputs at plug 9. The battery charging voltage, of course, is predetermined, and will correspond to either the series or parallel voltage of the generators.

FIG. 2 shows an emergency power pack according to the invention with two generator units for use as power source for mechanical or electrical consumers. The emergency power pack according to FIG. 2 consists of a generator unit 101 which is coupled with a second generator unit 102 via a loop coupling 103. A transmission gear 105 is attached to the first generator unit 101; this transmission gear 105 can be set in rotating motion by means of hand crank 104.

Figure 6:
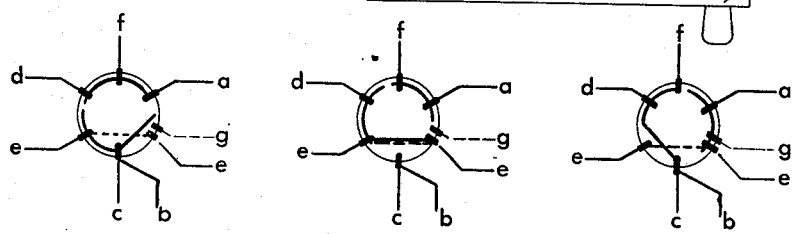

As in the emergency power pack according to FIG. 1, the two generator units are arranged axially behind each other as well as next to a battery 106. The free shaft end of the second generator unit 102 is coupled with a mechanical consumer 113 via a loop coupling 112; the mechanical consumer here might be, for example, the cutting head of an electric razor. The two generator units 101 and 102 can be connected in series or parallel by means of a series-parallel switch 107. Switch 107 can be designed as shown in FIGS. 4 and 5 but it has one additional switching position for motor operation, which is illustrated in FIG. 6. The ouput contact $a$ of series-parallel switch 107 is connected via a parallel connection of a cutoff rectifier 108 and an on-off switch 116 with a first contact of a plug bushing 109 which can also be connected with one of the poles of the battery 106 via a second on-off switch 110. The emergency power pack furthermore contains a reversing switch 117 whose movable contact is directly connected with one pole of the battery 106 while the reversing contacts are connected alternately to one pole of a resistance coil 115, serving, for example, as a cigarette lighter or to one pole of an incandescent bulb 114, whose other poles are connected with the other pole of the battery 106.

The generators are series-connected or parallel-connected in the same manner as in the emergency power pack according to FIG. 1 and this is therefore not explained in detail here. In the motor switching position illustrated in FIG. 6, the contacts $c$, $b$, $d$, and $f$, on the one hand, and the contacts $a$ and $e$, on the other hand, are connected with each other. In other words, the second generator unit 102 is merely connected with the output contacts $a$ and $b$ of switch 107, while the first generator unit 101 is short-circuited. Since the coupling 103 is designed as a freewheeling coupling, the short-circuit of the first generator unit 101 does not interfere with the running of the second generator 102 as the motor in this case. The direction of contact of the loop coupling 112 is so selected that the mechanical consumer 113 is driven only if the second generator unit 102 runs as a motor. The switch 116 must be closed during motor operation in order to bridge the reverse current cutoff rectifier 108. The latter is used to prevent—during charging—a return flow of the current from battery 106 into the generator units 101 and 102, as could happen during intervals in operation. Switch 116 can also be provided as an additional contact $g$ at the series-parallel switch 107, as indiacted in the broken line in FIGS. 2 and 4–6. The emergency power unit according to FIG. 2 can be used not only for powering the mechanical load 113 but also for feeding a resistance coil 115 serving as a cigarette ligther or a bulb 114. The reversing switch 117 provided for this purpose reveals three switching positions; one of them is shown in FIG. 2 in the middle switching position where the connecting arm (switching arm) is connected with neither of the contacts, as well as two outside switching positions, in which the contact arm is connected with the pole of the resistance coil 115, or alternately, with a pole of the bulb 114. The mechanical consumer 113 is preferably so designed that it can be placed in the remaining part of the equipment unit, so that various mechanical consumers can be connected to the emergency power pack.

Figure 3:
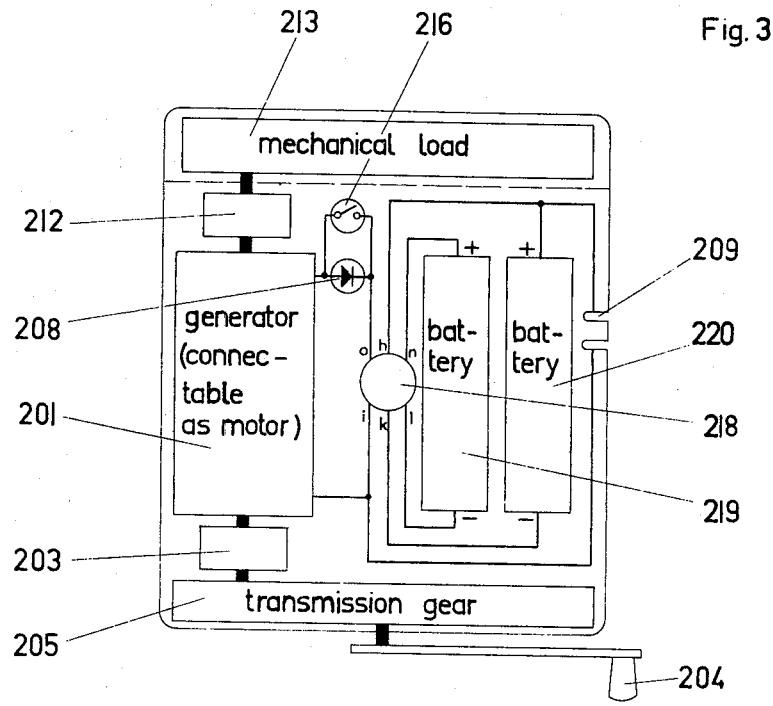
FIG. 3 shows one preferred version of an emergency power pack according to this invention which can be connected to mechanical or electrical consumers.

FIG. 3 shows a preferred version of an emergency power pack according to the invention which reveals merely a generator unit 201, which can be used both as charge generator and as motor. One shaft end of the generator unit 201 is connected via a centrifugal coupling 203 with a transmission gear 205 which can be driven by a hand crank 204. The other shaft end of the generator unit 201 is coupled via a loop coupling 212 with a mechanical load 213 which is removably attached to the remaining portion of the emergency power pack, as shown by the broken line. One connection of the generator unit 201 is connected via the parallel connection of a cutoff rectifier 208 with an on-off switch 216 with the contact *o* of a switch 218, while the other connection of generator 201 leads to contact *i* of that switch. The emergency power pack furthermore includes two separate batteries or battery cells 219 and 220 which have one of each of their poles connected, respectively, to contacts *h*, and *n*, the other of each of their poles being connected, respectively to the contacts *k* and *l* of switch 218. The contacts *h* and *i* are furthermore connected with the two bushings of plug bushing 209.

Figure 7:
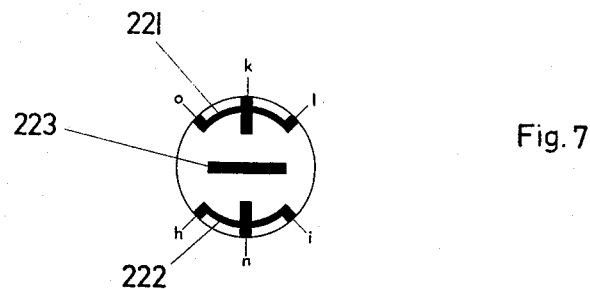
FIGS. 7 and 8 show the switching position of the reversing switch for the device according to FIG. 3.
Figure 8:
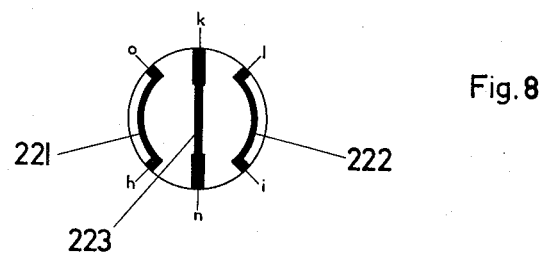

The structure of switch 218 is shown in FIGS. 7 and 8. Here, FIG. 7 shows the parallel connection of batteries 219 and 220, such as when used for the motor operation of the generator unit 201. According to FIGS. 7 and 8, switch 218 reveals 8 fixed contacts which cooperate with two diametrically opposite contact segments 221 and 222 which are independent of each other. Between these contact segments we have a contact bridge 223 which, in the parallel operating position shown in FIG. 7, is in contact only with two not-connected contacts. In the parallel- operation position (for motor operation), the contacts *o*, *k* and *l* are connected with each other by means of segment 221 while the contacts *h*, *n*, and *i* are connected with each other by the other contact segment 222.

For charging purposes, we turn switch 218 in any direction by 90°. Then the contacts *o* and *h* are connected with each other via one contact segment and the contacts *i* and *l* are connected with each other via the other contact segment. Furthermore, contacts *k* and *n* are connected with each other via contact bridge 223. The contacts *k* and *n* protrude radially further inside than the other contacts and the contact bridge 223 is so dimensioned that it can come into contact only with contacts *k* and *n*. This prevents any undesired short-circuiting of contacts during reverse-switching.

With switch 218 in this position, the batteries 219 and 220 are connected in series, the positive terminal of battery 220 being connected with one side of generator 201 and the negative terminal of battery 219 being connected to the other side of generator 201. The positive side of battery 219 is connected to the negative terminal of battery 220 through contacts *k* and *n* on switch 218.

Switch 218 causes a pole-change of the connections between the battery and the generator unit 201. Therefore, when operated as motor, unit 201 runs in the opposite direction of rotation, as compared to its rotation as charge generator. Since the loop coupling 212 constitutes a directional coupling, we can avoid a situation in which the mechanical consumer 213 is moved along with the generator 201, while the battery is being charged.

The centrifugal coupling 203 is designed such that the structural parts, which are exposed to the centrifugal force, are positioned on the drift shaft of transmission gear 205, so that coupling takes place only if we start turning hand crank 204. But if hand crank 204 stands still, then the centrifugal-force coupling 203 is uncoupled, regardless of the movement and direction of rotation of generator unit 201.

The emergency power pack according to FIG. 3 facilitates rapid charging of the batteries, whereby the generator unit 201 is operated with a lower r.p.m. when operating as a motor than during the charging operation. This enables us to make sure that the generator unit 201, during the motor and generator operations, works with differing outputs, so that it is not necessary to provide a special-high-performance generator for fast-charging, according to this invention.

Figure 9:
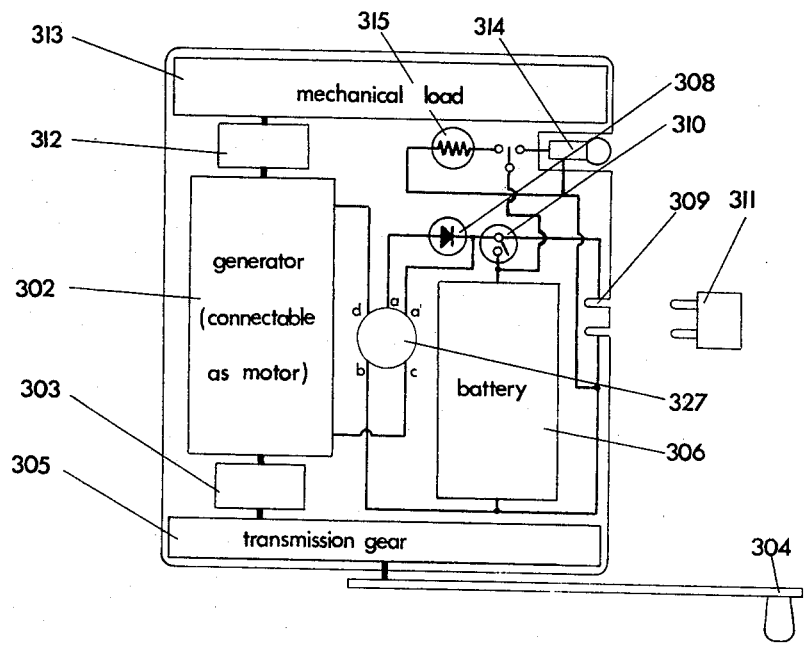
FIG. 9 shows a simplified emergency power pack according to this invention.

FIG. 9 shows another, simplified version of an emergency power pack according to the invention. The emergency power pack illustrated in this figure consists of a transmission gear 305 which can be driven by means of hand crank 304 and which, via a centrifugal-force coupling 303, drives a machine unit 302 which is connected with a mechanical consumer 313 via a directional coupling 312. The machine unit 302 can be used as a generator or as a motor and it is connected to contacts *d* and *c* of an operating switch 327. A contact *b* of the latter leads to one pole of a battery 306 as well as to one plug bushing 309. A contact *a* runs via a rectifier 308 while a contact *a'* runs directly to the other pole of the plug bushing 309. To this bushing we have furthermore connected one contact of a battery cutoff switch 310 whose other contact is connected with the other pole of the battery 306, as well as with a middle contact of a reversing switch, with which we can turn on, as desired, either a resistance coil 315 of a cigarette light or a bulb 314.

The function of the machine unit is the same as in the device shown in FIG. 3, with the exception that operation as a generator and as a motor of the machine unit 302 takes place approximately at the same voltage.

Figure 10:
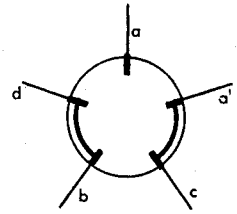
FIGS. 10 and 11 show the structure and various switching positions of reversing switch 327 of the emergency power pack according to FIG. 9.
Figure 11:
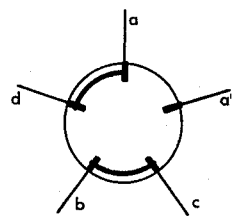

FIGS. 10 and 11 show the operating switch 327 in operating position as a motor and as a charging generator, respectively.

In FIG. 10, the battery 306 is connected via contacts *d* and *b* to one side of motor (generator) 302. The other side of battery 306 is connected via contacts *a'* and *c* to the other side of generator 302, thus bypassing rectifier 308. In FIG. 11, one side of generator 302 is connected via contacts *d* and *a* of switch 327 to one side of battery 306. The other side of generator 302 is connected via contacts *c* and *b* to the other side of battery 306. The foregoing, of course, assumes that switch 310 is closed. When switch 310 is open, the generator 302 would be connected to plug bushing 309 as discussed above.

The switches 7, 107, 218, and 327 can, of course, be designed in a different way in order to accomplish the desired function.

With the help of the emergency power pack according to this invention, we can reliably prevent an overloading of the batteries. Generally a hand crank cannot be turned at more than 150–250 r.p.m. for a long period of time, not even by very strong and muscular persons, because the frequency at which the human hand can be moved back and forth, is physiologically limited to about 6 c.p.s. But here we must keep in mind that, at this frequency, we practically can not transmit any power or force at all. If we therefore dimension an emergency power pack in such a way that the maximum r.p.m. of the charge generator, at which the desired maximum charge current is produced, will be reached when we have a hand-crank rotation of about 150–250 r.p.m., then this r.p.m. cannot be increased in practice any further because of physiological reasons. Furthermore, if we design the transmission gear and the load on the generator unit in such a way that the fatigue time for the operator, figuring on the above mentioned r.p.m., would be less than 10 minutes and preferably less than 5 minutes, then we get the further advantage that the charge current will keep dropping because the r.p.m. keeps dropping as the person gets more and more tired. This brings about a rather considerable easing-up on the batteries because, in the empty state, these batteries can be charged with a comparatively strong current which however must be reduced as the load increases. In the case at hand, this is done automatically and without any complicated regulating mechanism.

We get a particularly favorable load characteristic if the generator unit, when the hand crank puts out 40–100 r.p.m., achieves the voltage of the battery in the discharged state. Below this r.p.m. the battery is thus no longer charged.

In an emergency power pack, which reveals these features, the maximum charge current is thus limited by the physiologically-conditioned maximum motion frequency of the human hand and the charge energy is limited by the fact that the r.p.m. of the hand crank decreases with increasing fatigue, which means that the charging will gradually decrease and finally stop altogether.

The load or charge state of the battery can be tested here by connecting one or more mechanical or electrical consumers and observing their operating behavior.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains.

I claim:
1. A power pack comprising:
   (a) gastight maintenance-free storage battery means,
   (b) a hand crank operated transmission gear,
   (c) a generator means for generating a charging current ranging from 10 to 100 times the rated charging current of said battery means for a period of time of less than one hour, said generator means further including:
      (1) a first generator,
      (2) a second generator in coaxial alignment with said first generator,
   (d) a rectifier means for electrically connecting said generator to said battery means,
   (e) mechanical means for coupling said generator means to said transmission gear,
   (f) means for coupling said first generator at one end of its axis to said transmisison gear,
   (g) a free wheeling coupling means connected to the other end of the axis of said first generator and connected to said second generator,
   (h) a mechanical load connected by a loop coupling to said second generator, said second generator being also connectable as a motor,
   (i) a switch for connecting said second generator to said battery means,
the generator means and transmission gear being designed such that the maximum charging current is generated at a hand crank speed of between 150 and 250 rotations per minute.

2. A power pack comprising:
   (a) a pair of gastight maintenance-free storage battery means,
   (b) a hand crank operated transmission gear,
   (c) a generator means for generating a charging current ranging from 10 to 100 times the rated charging current of said battery means for a period of time of less than one hour, said generator means comprising a single generator adapted to be connected as a motor,
   (d) rectifier means for electrically connecting said generator means to said battery means, and
   (e) mechanical means for coupling said generator means to said transmission gear,
   (f) the generator means and the transmission gear being designed such that the maximum charging current is generated at a hand crank speed of between 150 and 250 rotations per minute.
   (g) a switch being provided for selectively connecting the pair of batteries in parallel or in a series to the generator and for reversing the polarity of connection,
   (h) a centrifugal coupling for coupling said generator to said transmission gear,
   (i) a loop coupling adapted to couple said generator to a mechanical load whereby said switch is adapted to connect the pair of batteries in series for charging operation and in parallel for motor operation.

References Cited

UNITED STATES PATENTS

| | | | |
|---|---|---|---|
| 1,485,856 | 3/1924 | Kjekstad | 307—71 X |
| 1,962,992 | 6/1934 | Leece et al. | 307—67 |
| 2,393,813 | 1/1946 | Roggan | 310—75 |
| 2,977,525 | 3/1961 | Medlar | 320—21 X |
| 3,240,947 | 3/1966 | Mas | 307—66 X |
| 3,201,681 | 8/1965 | Van Wilgen et al. | 320—68 X |
| 3,210,634 | 10/1965 | Stern | 320—61 |
| 3,256,474 | 6/1966 | Englund | 320—16 X |

OTHER REFERENCES

Storage Batteries, Vinal, 4th ed., 1955, p. 245 relied upon.

LEE T. HIX, Primary Examiner

J. GUNTHER, Assistant Examiner

U.S. Cl. X.R.

307—66, 71; 320—16, 56, 62